United States Patent [19]

Brunner

[11] Patent Number: 5,796,790
[45] Date of Patent: Aug. 18, 1998

[54] RELIABLE RELATED BILLING ID INFORMATION METHOD FOR CALL DELIVERY

[75] Inventor: Robert Frank Brunner, Montreal, Canada

[73] Assignee: Telefonaktiebolaget L M Ericsson, Stockholm, Sweden

[21] Appl. No.: 409,664

[22] Filed: Mar. 24, 1995

[51] Int. Cl.⁶ ..................................................... H04Q 7/22
[52] U.S. Cl. ........................................ 379/59; 379/58
[58] Field of Search ................... 379/58, 59, 60, 379/61, 67, 112; 370/54; 380/21; 390/825.31

[56] References Cited

U.S. PATENT DOCUMENTS

| 5,469,496 | 11/1995 | Emery et al. | 379/58 |
| 5,517,555 | 5/1996 | Amadon et al. | 379/59 |
| 5,537,610 | 7/1996 | Mauger et al. | 379/58 |

OTHER PUBLICATIONS

Carlson, "The Promise of DMH", Cellular Business, Nov. 1994.
Buckley, "Cellular Billing Problems Do Have Solutions", Telephony, Jun. 1986.
IS–124 Impacts on IS–41, Rev. 0, Telecommunications Industry Working Group 4: Message Accounting, Jul. 11, 1994.

*Primary Examiner*—William Cumming
*Attorney, Agent, or Firm*—Smith & Catlett, P.C.

[57] ABSTRACT

A system and method for communicating accounting and billing operations information between a gateway mobile switching center (G-MSC) and a visiting mobile switching center (V-MSC) to which a call is being directed to a mobile station within a cellular telecommunications network. The method comprises the steps of: generating in the serving MSC first billing identification data for the call; transmitting the first billing identification data to the destination MSC; generating second billing identification data in the destination MSC corresponding to a call transaction that has occurred in the destination MSC; and returning the second billing identification data as related billing identification data to the serving MSC after an outcome for the call has been determined in the destination MSC. The outcome of the call is determined when a page response has been received in the V-MSC from the mobile station or alternatively, a call has been delivered by seizing a trunk from the serving MSC to the destination MSC. The method has application in a data message handler communication protocol system for communicating accounting and billing operations within the cellular telecommunications network.

28 Claims, 4 Drawing Sheets

RELIABLE RELATED BILLING ID INFORMATION METHOD FOR CALL DELIVERY

FIELD OF THE INVENTION

The present invention relates to a Data Message Handler (DMH) communication protocol system for use in a cellular telecommunications network and a related method for communicating accounting and billing operations within the network.

BACKGROUND OF THE INVENTION

Cellular telecommunications networks currently employ multi-system mobile switching center (MSC) networks that operate with different proprietary billing protocols. Consequently, it is difficult for operators to correlate billing information amongst these MSC networks. It is not possible at this time to correlate this information on a real time basis. Due to the differences in proprietary billing protocols between MSC networks, calls that are setup through several multi-system MSC's are rated according to the information logged in either the gateway MSC through which the call is setup to the PSTN or the anchor MSC through which the call is delivered to the mobile station (MS).

Currently, the Telecommunications Industry Association (TIA) standard known as IS-41, herein incorporated by reference, makes provisions for billing information to be sent in the forward direction from a serving or gateway MSC (G-MSC), serving a call request, to a destination or visiting MSC (V-MSC) delivering the call to the mobile subscriber. This billing information corresponds to a "BillingId" data field that is defined to include the switch identity (SWID), the IS-41 Call Identity (CALLID), and the leg of the call (LEG NO) (hereinafter collectively referred to as BillingId). The purpose of the BillingId in the "call-delivery" is to deliver a correlating BillingId in an IS-41 invoke message from the G-MSC to V-MSC. IS-41 makes no provision to return to the G-MSC any billing information generated in the V-MSC for the purpose of correlating the billing information.

The Telecommunications Industry Association (TIA) is currently developing standard IS-124 known as the DMH standard. The TIA has suggested in the IS-41 Rev C Ballot, Jul. 11, 1994, SYNACOM TECHNOLOGY (herein incorporated by reference) the introduction of a BillingId data field in the "call-delivery" IS-41 return result messages. IS-124 proposes sending a BillingId, comprising SWID+CALLID+LEG NO information which identifies a leg of a call at a V-MSC, from the V-MSC to the G-MSC. The BillingId generated in the visiting MSC (V-MSC) is sent back to the serving or gateway MSC (G-MSC) as part of the "RouteRequestReturn" and ReturnResults messages such as return results for LocateRequest, FeatureRequest, OriginationRequest, and TransferNumberRequest. By using the standardized IS-124 DMH communication protocol it should be possible to share call event information amongst multi-system MSC networks and perform immediate accounting and billing operations. In certain call scenarios, however, this proposed standard would return unreliable and incorrect billing information to the G-MSC.

In instances where the "BillingId" is sent from a bordering/destination system or V-MSC towards a serving system or G-MSC, the BillingId can be incorrect in certain situations, or the BillingId can be allocated and not used to tag billing data. Thus the current proposed IS-124 standard in certain call delivery situations can result in the transmission of unreliable BillingId information from the V-MSC to the G-MSC.

For example, in a situation where a call is initiated to a MS that is located at a V-MSC and where a voice channel is not allocated prior to delivering a call to the MS, the BillingId will be allocated to the called party by the V-MSC upon reception of the RouteRequest message (ROUTREQ). If the call is ended by the calling party in the G-MSC while the BillingId is being transmitted by the V-MSC to the G-MSC then the BillingId gets wasted because the BillingId does not get to tag a call in the V-MSC. The result is an unreliable BillingId.

Another example of an unreliable BillingId can occur in a situation where the MS is in the V-MSC, the MS has made a three way call and the current call LEG NO. is tagged as LEG NO.=n. Should a subsequent call waiting call be initiated to the MS in the V-MSC, then a BillingId of LEG NO.=n+1 would be allocated to the call waiting call upon reception of a RouteRequest message in the V-MSC. This BillingId would then be returned to the G-MSC via the IS-41 RouteRequest/ LocationRequest messages. Should the MS end the call while the BillingId is being transmitted to the G-MSC and the MS subsequently initiates a new call with a new CALLID and a LEG NO.=0, then the subsequent received three way call with the previously generated CALLID and LEG NO.=n+1 would be inconsistent with the new call. The result is an unreliable BillingId.

Yet another example of an unreliable BillingId can occur when the MS is in the V-MSC already setup on a call that is tagged as LEG NO.=n and a subsequent call waiting is attempted to the MS. A BillingId of LEG NO.=n+1 is allocated to the call waiting at reception of the IS-41 RouteRequest message and returned to the G-MSC. Should the call be delivered to the V-MSC but not answered, then subsequent "C-number" call diversions may possibly occur in the V-MSC being tagged with BillingId LEG NOs. n+2, n+3 and so on. If the called party in the V-MSC happens to initiate a three way call in parallel, there potentially could be conflicting or interleaved leg numbering. Thus there is a need to be able to tag the diverted calls with a new CALLID which is an aspect addressed by the present invention.

These above mentioned inconsistencies in the reporting of BillingId information results in unreliable billing identification information being fed back to the G-MSC network.

It would be a distinct advantage to have a DMH communication protocol system that is capable of returning to the G-MSC reliable Related BillingId information for call delivery. The present invention provides such a system.

SUMMARY OF THE INVENTION

The present invention is directed to a DMH communication protocol system that is capable of returning to the G-MSC reliable related billing identification information for call delivery. The present invention provides such a system by returning a new Information Back for Call Delivery (INFOBACKCD) (invoke) message from the destination MSC, or V-MSC, to the serving MSC, or G-MSC, after an outcome for the call has been determined in the V-MSC. The new INFOBACKCD message comprises two parts. The first part is the BillingId (invoke) sent in the forward direction from the G-MSC to the V-MSC. The second part of the INFOBACKCD message is a Related BillingId which is the BillingId allocated in the V-MSC after a call has been delivered. It should be understood that a Related BillingId describes the billing information sent to the G-MSC. In the industry, the BillingId generated in the G-MSC becomes the Related BillingId from the perspective of the V-MSC. However, the for the purposes of the specification and claims, unless identified otherwise, the term Related BillingId refers to the BillingId information generated at the V-MSC as seen by the G-MSC.

The outcome of a call can be determined when a page response is received by the V-MSC from the mobile station or after the call delivery is made from the G-MSC to the V-MSC. At this time a more reliable message is returned to the G-MSC. This information can be used exclusively to tag call transactions or can be used to correlate call transactions in the G-MSC and V-MSC.

In accordance with an aspect of the present invention there is provided a data message handler (DMH) communication protocol system for use in a cellular telecommunications network for communicating accounting and billing information associated with a call to a mobile station within the network. The system includes a visiting mobile switching center (V-MSC) where said mobile station to which the call is being directed is located and a gateway mobile switching center (G-MSC) which upon delivery of said call to the G-MSC, generates first billing identification data and transmits the first billing identification data as part of a call invoke message to said V-MSC. The V-MSC includes means for allocating second billing identification data corresponding to a call transaction that has occurred in the V-MSC in response to said the invoke message. The V-MSC also includes means V-MSC for returning the second billing identification data to the G-MSC as related billing identification data after an outcome for the call has been determined.

Preferably, the V-MSC returns an "Information Back for Call Delivery" message (INFOBACKCD) that includes the related billing identification data from the V-MSC and the billing identification message forwarded from the G-MSC to the V-MSC. It is envisaged that the related billing identification data is formulated in the V-MSC by the V-MSC allocating an incremented leg number to previously generated billing identification data when the delivered call is an extension of the original call to the mobile station, such as for example, a call waiting leg that is to be answered, or the V-MSC allocating new billing identification data when the delivered call is a new call or not an extension of the existing call.

In accordance with another aspect of the present invention there is provided a method of communicating accounting and billing operations information between a serving MSC and a destination MSC to which a call is being directed to a mobile station within a cellular telecommunications network. The method comprises the steps of:

generating in the serving MSC first billing identification data representative of the call in the serving MSC;

transmitting the first billing identification data to the destination MSC;

generating second billing identification data in the destination MSC corresponding to a call transaction that has occurred in the destination MSC; and returning the second billing identification data as related billing identification data to the serving MSC after an outcome for the call has been determined.

BRIEF DESCRIPTION OF THE DRAWINGS

For a better understanding of the nature and objects of the present invention reference may be had to the accompanying diagrammatic drawings in which.

DETAILED DESCRIPTION

While any communication protocol may be utilized within the scope and intent of the present invention, the preferred embodiment described herein utilizes the most commonly used communications protocol in the cellular industry set by the IS-41 standard.

The present invention contemplates a new message being added to the IS-41, Revision C. This new message is a billing information return message referred to throughout the specification as the INFOBACKCD message. The significant difference about this message is that it is returned after an outcome for the call has been determined. This may be either a page response received from the mobile station or when a call has been delivered to the mobile station (MS). At this time the INFOBACKCD message containing the billing identification data (BillingId) contained in the IS-41 messages is sent from the serving MSC (G-MSC) to the destination MSC or (V-MSC) and includes related billing identification data (Related BillingId) generated by the V-MSC which is not prone to the inconsistencies described in the background of the invention.

The BillingId and Related BillingIds of the present invention conform to the IS-41 standard protocol. The BillingId's are composed of a 24 bit global exchange identity (GLEXM) (switch identity SWID)+a 24 bit call identification (CALLID)+an 8 bit Segment number. The CALLID part is used to tag a specific caller, i.e. one "CALLID" is tied to each caller in a call. The Segment Number represents a "leg number" to identify all the calls a caller has been involved in, i.e. the first call setup by a caller would have a "leg number=0", a second three way call would be tagged with a "leg number 1", reception of a call waiting call would be tagged with a "leg number=2", and so on. The BillingId and Related BillingId data forming parts of the INFOBACKCD message are used to tag the IS-124 Origination, Redirection, Feature Activation, and Termination Leg Subrecords. The meaning of "Segment Number" in each of these IS-41 BillingId fields is to identify a "Leg No." The leg number is passed between MSC's in the signaling messages of IS-41 as part of the BillingId field of RouteRequest, LocationRequest, IntersystemPage, UnsolicitedResponse and Redirection Messages.

Figure 1:
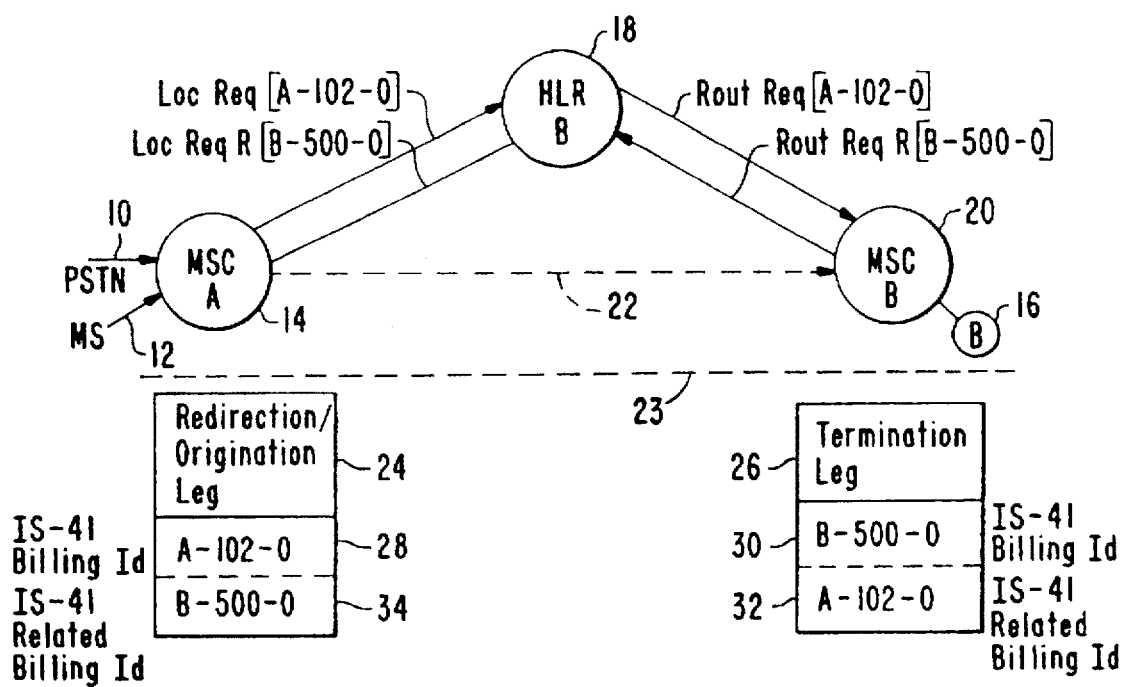
FIG. 1 is a network node drawing illustrating the signaling utilized in the IS-41 and proposed in the IS-124 specification.

Referring to FIG. 1 there is shown a network node drawing illustrating the signaling utilized in the IS-41 as proposed by the IS-124 specification. Currently, in the IS-41 standard, a call is setup or delivered from a public switching network (PSTN) 10 or a mobile station (MS) 12 to a serving MSC 14, hereafter referred to as MSC-A 14. The call delivery information contains the B identification number for the MS-B 16. To set up the call to MS-B 16, the MSC-A 14 sends a Location/Request message (LOCREQ) (invoke) to HLR-B 18. The LOCREQ number includes the B-number information and BillingId in accordance with the IS-41 protocol set out in the above paragraph. For simplicity this BillingId is listed as SWID=A, CALLID=102, and LEG NUMBER=0. In other words the BillingId identifies the call coming from MSC-A to be the 102nd call set up by MSC-A with this particular call being the first leg of the call. The drawing illustrates this information as BillingId |A-102-0|. Upon receipt of the LOCREQ message, the HLR-B 18 then determines if the B-number is a valid number. If the B-number is a valid number, the HLR-B 18 sends a RouteRequest (ROUTREQ) (invoke) message to MSC-B 20. This ROUTREQ includes the BillingId |A-102-0|. Upon receipt of this ROUTREQ MSC-B 20 creates its own call record by assigning its own BillingId. In this example, a SWID=B, CALLID=500 and a LEG NUMBER=0 is assigned |B-500-0|. MSC-B 20 sends a RouteRequestReturn (ROUTREQR) (response) message to HLR-B. It is in the proposal for the IS-124 standard that ROUTREQR message includes the BillingId |B-500-0| generated in the MSC-B 20. This feature was not originally provided in the IS-41 standard. Next, the HLR-B sends a LocateRequestReturn (LOCREQR) (response) message to MSC-A 14. The LOCREQR message also includes the MSC-B BillingId |B-500-0|. The MSC-A 14 then establishes a trunk 22 to MSC-B 20 along which the call is delivered.

Below dotted line 23 in FIG. 1 is shown the billing records that are established for the call delivered at 22 during the call setup process. The billing record established by MSC-A 14 for the origination or redirection leg of the call is shown at 24. The billing record established by MSC-B 20 for the termination leg of the call is shown at 26. The BillingId |A-102-0| shown in box 28 of record 24 is first generated by MSC-A 14. Next, MSC-B 20 stores the BillingId [A-102-0] at 32 in record 26 as a Related BillingId. MSC-B 20 stores its generated BillingId [B-500-0] at 30 in record 26. The standard IS-41 provides for the three pieces of information to be stored in these two records. This means that the termination leg record 26 of the call could trace the call back to the origination leg record of the call 24 if need be at a later date. With the introduction of the MSC-B 20 BillingId [B-500-0] being sent back in the response messages during call setup to MSC-A 14 as provided for by proposed standard IS-124, the origination call record 24 then has a Related BillingId [B-500-0] at 34. This now allows for forward call correlation at a later date or upon call completion. The problems associated with this call set up scheme proposed by the standard IS-124 relate to the return of incorrect BillingId information to the MSC-A in the event the call is not delivered and these problems have been discussed heretofore in the Background of the Invention.

Figure 2:
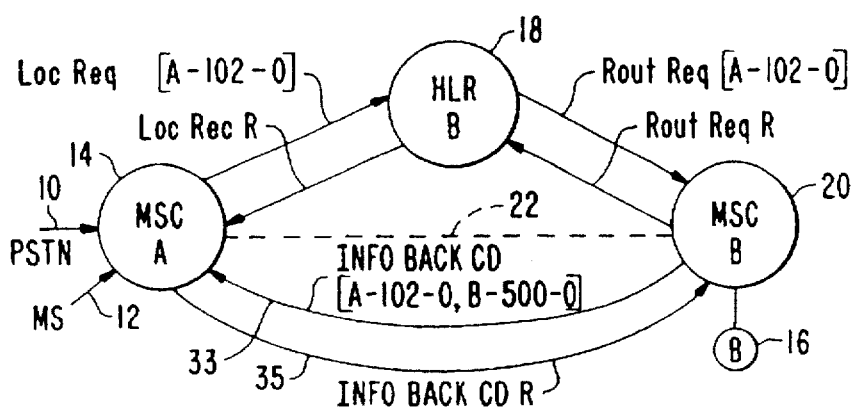
FIG. 2 is a network node drawing illustrating the signaling of the preferred embodiment of the present invention.

Referring to FIG. 2 the preferred embodiment for the present invention is illustrated. For the most part, the signaling provided in FIG. 2 is consistent with the IS-41 signaling as shown in FIG. 1. However, there are fundamental differences in signaling between FIG. 1 and FIG. 2. The first fundamental difference is that the ROUTREQR message in FIG. 2 from the MSC-B 20 to the HLR-B 18 from the MSC-A does not include the BillingId [B-500-0]. The second fundamental difference is that the LOCREQR message sent from the HLR-B 18 to the MSC-A 14 does not include the BillingId |B-500-0|. These two fundamental differences are peculiar to the preferred embodiment of the present invention. In the present invention, it is only after an outcome of a call is determined either by a page response being received from MS-B 16 or a trunk 22 being established that a separate "information back for call deliver" INFOBACKCD (invoke) message 33 is sent to the MSC-A 14 from the MSC-B 20. The INFOBACKCD message 33 contains the BillingId number generated by the MSC-B |B-500-0| the BillingId number generated in the MSC-A 14 |A-102-0|. The information is sent back in a protocol of |BillingId, Related BillingId| or |A-102-0, B-500-0| in this example, such that this information can now be stored in a new billing record 24 for the origination leg of the call. Furthermore, this INFOBACKCD message can be sent back directly by the MSC-B 20 to the MSC-A 4. Next, the communications protocol of the present invention has the MSC-A 14 send an "information back for call delivery response" (INFOBACKCDR) (response) message 35 to the MSC-B 20 as an acknowledgment that the INFOBACKCD message 33 was received. While FIG. 2 does not show billing records 24 and 26, it should be understood from the foregoing description that the signaling protocol of the present invention will provide for the generation of the illustrated billing records of FIG. 1.

Figure 3:
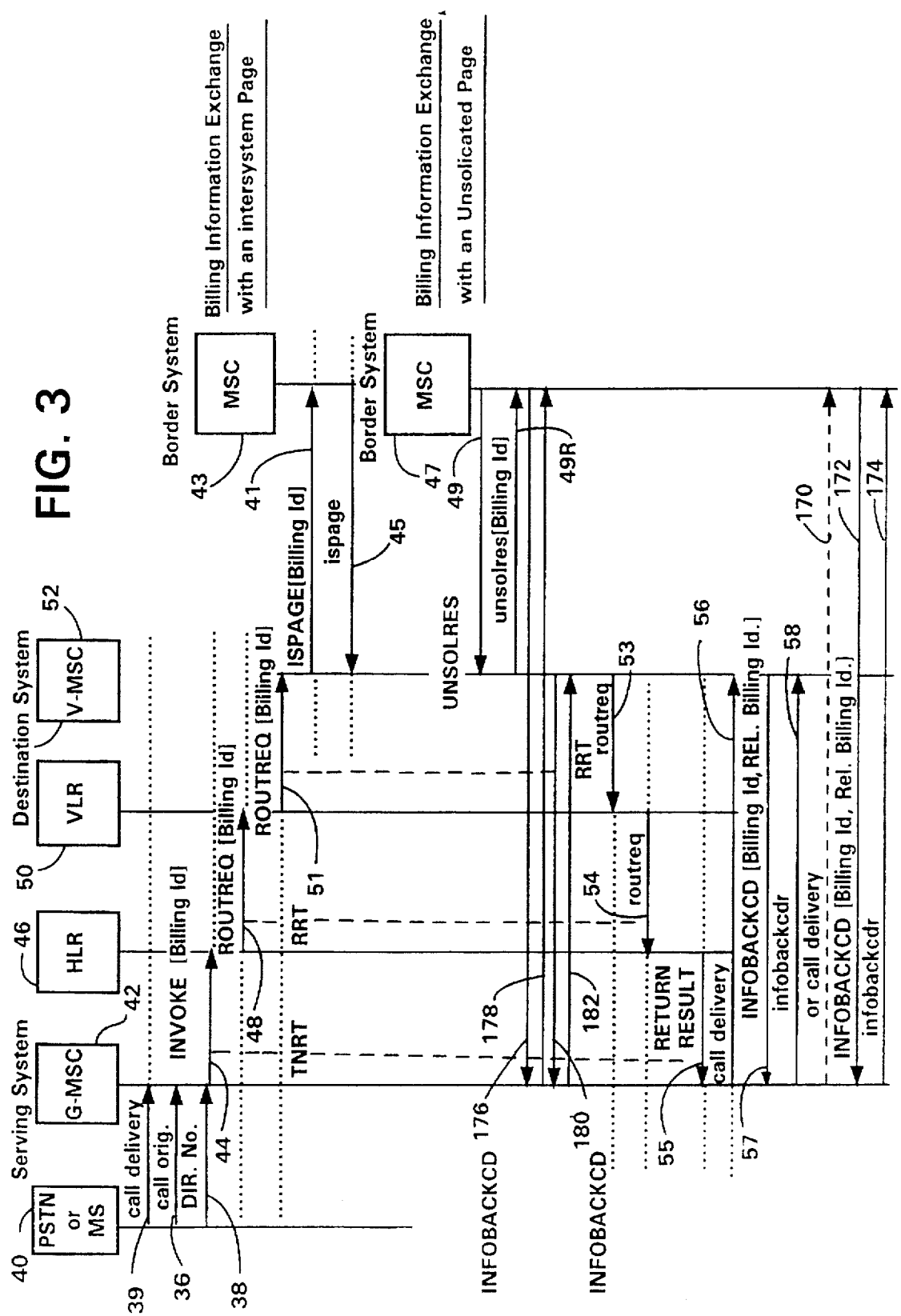
FIG. 3 is a message flow diagram illustrating the steps occurring during serving invoke requests and passing of billing identifiers in the preferred embodiment of the present invention.

Referring to FIG. 3, a preferred embodiment for the present invention is described in the form of a message flow diagram illustrating the steps occurring during serving invoke requests and passing of billing identifiers. While this description may be somewhat redundant in view of the previous description of FIG. 2, it is believed that it will be helpful to the implementation of the signaling protocol of the present invention. First a call origination 36 and dialed mobile address digits (i.e., directory number) 38 are received either from another mobile station via a cell or from the public switched telephone network (PSTN) 40 at a serving or gateway MSC (G-MSC) 42 using protocols defined by the IS-41 interconnection standard. The delivery of this call is illustrated by call delivery 39.

Next the G-MSC 42 sends an INVOKE (invoke) message 44 request including the BillingId to the home location register (HLR) 46 associated with the called mobile station. The association of the called mobile station to the HLR 46 is made through directory number 38. It should be understood that the INVOKE message 44 may be comprise anyone of several different types of messages such as a FeatureRequest message (FEATREQ), an OriginationRequest message (ORREQ), a LocationRequest message (LOCREQ), or a Transfer Number request (TRANUMREQ). All of these messages will include BillingId data.

Next, if the directory number is assigned to a legitimate subscriber, the HLR 46 sends a "RouteRequest (ROUTREQ) (invoke)" message 48 to a visiting HLR (VLR) 50 that last provided a registration notification for the called mobile station. The VLR 50 then sends a ROUTREQ (invoke) message at 51 to a destination MSC (V-MSC) 52. Both ROUTREQ messages 48 and 51 include the BillingId.

Next, there are several ways the call can be delivered to the MS. First the V-MSC 52 sends out a page request in its area to see if the MS located in its area. If the MS is located in the V-MSC's 52 coverage area, the MS should respond to the page and the V-MSC sends out a ROUTREQ (response) message 53 to the VLR 50.

At the same time the V-MSC 52 is sending out a page request to the MS, the V-MSC also sends ISPAGE (invoke) message 41 to several border MSC's 43. The ISPAGE message 41 will include BillingId information allowing the border MSC 43 to bill the call in the event the border MSC 43 delivers the call to the MS. The purpose of the ISPAGE message is to locate the MS in the event the MS is not located in its last registered V-MSC 52, the bordering MSC's 43. In the event the MS is located in one of the border MSC's 43 and the MS sends a page response back to the border MSC 43, an ISPAGE (response) message 45 is sent back to the V-MSC 52. The V-MSC 52 then sends out the ROUTREQ (response) message 53 to the VLR 50 advising that the border MSC is prepared to set up the call.

Still yet another scenario to set up the call to the MS occurs when the MS in response to a page from the V-MSC 52, sends a page response message to another border MSC 47 which did not receive the ISPAGE (invoke) message 41. This scenario can happen because upon receipt of a page, the MS goes through a rescan process looking for the strongest signal channel to lock onto. If that channel is associated with the coverage provided by border MSC 47, then the MS sends its page response back to the border MSC 47. At this time, the border MSC 47 sends an Unsolicited Response (UNSOLRES) (invoke) message 47 to the V-MSC 52 with BillingId information. The V-MSC 52 returns an UNSOL-RES (response) message 49R to the border MSC 47. This return message includes BillingId information allowing the border MSC 47 to tag for the call. The V-MSC 52 then sends out a ROUTREQ (response) message 53 to the VLR 50.

After the ROUTREQ (response) message 53 is sent to the VLR 50, the VLR 50 in turn sends a ROUTREQ (response) message 54 back to HLR 46. HLR 46 then returns a return result (RETURNRESULT) message to the G-MSC.

In accordance with the present invention, at this time any of V-MSC 52, or border MSC's 43 or 47 may receive a page response form the MS. If this happens it is an indication of a new call being set up to the MS and the an appropriate serving MSC (43, 47 or 52) allocates the BillingId. If one of the bordering MSC's 43 or 47 receives the page response then the INFOBACKCD (invoke) message 176 is sent from this MSC to the G-MSC 42. Message 176 is shown as one message and it should be understood that each of bordering MSC's 43 and 47 would have its own INFOBACKCD message 178. A return acknowledgment INFOBACKCDR is sent from G-MSC 42 to the appropriate MSC 43 or 47 at 178. If one of the V-MSC 52 receives the page response, then the INFOBACKCD (invoke) message 180 is sent from this V-MSC 52 to the G-MSC 42. A return acknowledgment INFOBACKCDR is sent from G-MSC 42 to the appropriate V-MSC 52 at 182.

Upon receipt of the RETURNRESULT (response) message 55 the call is delivered to the MS by a call delivery being setup on trunk 56 or trunk 170 depending on which MSC (43,47, or 52) has received the page response from the MS.

In accordance with the present invention, if no page response is received form the mobile station in the V-MSC or bordering MSC's, then once the call delivery 56 or 170 is set up, an INFOBACKCD (invoke) message 57 or 172, respectively, is sent from the V-MSC 52 to G-MSC 42. The G-MSC 42 then sends a INFOBACKCDR (response) message 58 or 174 to the appropriate MSC to complete the communications.

The INFOBACKCD message comprises the BillingId originally forwarded by the G-MSC and a new piece of information. This new information comprises the Related BillingId which has been generated by the V-MSC.

Figure 4:
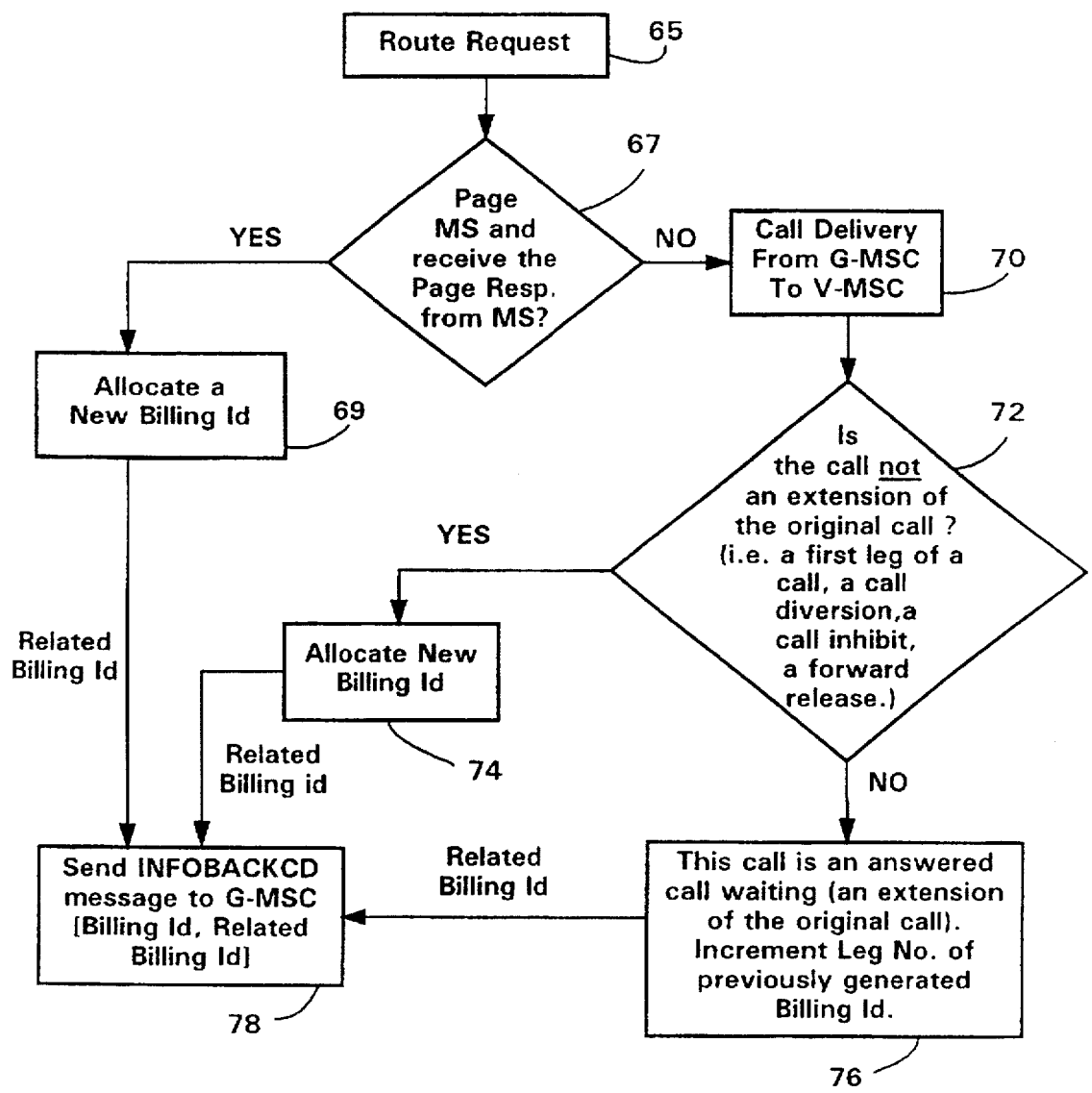
FIG. 4 is a flow diagram of the steps the V-MSC takes to generate the Related BillingId information in accordance with the preferred embodiment of the present invention; and, FIG. 5 is a is a message flow diagram illustrating the steps occurring in an alternative embodiment of the present invention that utilizes a hybrid solution comprising the INFOBACKCD message of the present invention and the BillingIds proposed by Synacom Technology, Inc. in the above referenced paper entitled IS-124 Impacts on IS-41, Revision 0.

The generation of the Related BillingId in the V-MSC is shown in the flow chart of FIG. 4 for a RouteRequest message. It should be understood that a flow chart for the ISPAGE or UNSOLRESPONSE messages would be similar to that described below and the differences in the flow chart should be readily apparent to a man skilled in the art. Once a RouteRequest 65 is received at the V-MSC, the V-MSC pages the MS and waits to receive a page at 67. If a page response is received from the MS, then the V-MSC allocates a new BillingId at 69. Next, because the outcome of the call has been determined at 67 by the "YES" answer, the BillingId is sent back to the G-MSC as a Related BillingId as part of the INFOBACKCD message at 78. The BillingId of the INFOBACKCD message corresponds to the BillingId originally generated in the G-MSC at call setup.

In the event no page response is received from the MS at 67, after the call is delivered from the G-MSC to the V-MSC at 70, the V-MSC then interrogates the call by determining if the call is not an extension of the original call at 72. This may be a call that the first leg of the call, a call diversion, a call inhibit or a forward release. If the call is affirmative for any of these inquiries, then the V-MSC allocates a new BillingId to the call at 74 and makes this part of the Related BillingId. The V-MSC then formulates the INFOBACKCD message at 78 by putting together the BillingId information sent by the G-MSC and the Related BillingId from step 78. Because the interrogation of step at 72 is negative, then the call being delivered is an answered call waiting leg. The V-MSC then at 76 increments the leg number of this previously generated BillingId. Next the V-MSC formulates the INFOBACKCD message at 78 by putting together the BillingId information sent by the G-MSC and the Related BillingId from either step 74 or 76.

Figure 5:
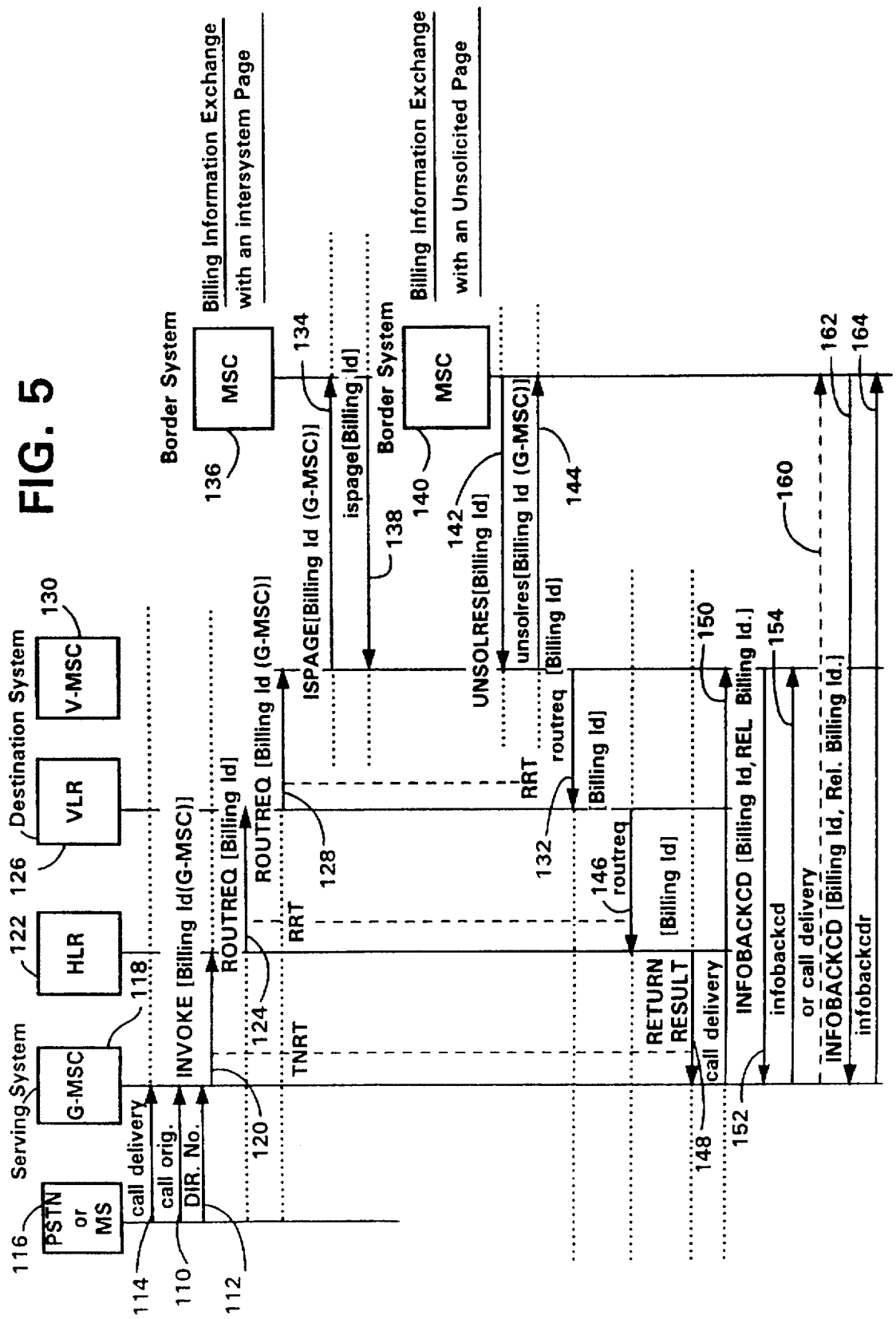

Referring to FIG. 5 there is shown message flow diagram illustrating the steps occurring during serving invoke requests and passing of billing identifiers in an alternative embodiment of the present invention that utilizes a hybrid solution comprising the INFOBACKCD message of the present invention and the BillingIds proposed by Synacom Technology, Inc. in the above referenced paper entitled IS-124 Impacts on IS-41, Revision 0. First a call origination 110 and dialed mobile address digits (i.e., directory number) 112 are received either from another mobile station or from the public switched telephone network (PSTN) 116 at a serving or gateway MSC (G-MSC) 118 using protocols defined by the IS-41 interconnection standard. The delivery of this call is illustrated by call delivery 114.

Next the G-MSC 118 sends an INVOKE (invoke) message 120 request including billing identification information in the message (BillingId) to the home location register (HLR) 122 associated with the called mobile station. The association of the called mobile station to the HLR 122 is made through directory number. It should be understood that the INVOKE message 120 may be comprise anyone of several different types of messages such as a FEATREQ, ORREQ, LOCREQ, and TRANUMREQ. All of these messages will include the BillingId.

Next, if the directory number is assigned to a legitimate subscriber, the HLR 122 sends a ROUTREQ (invoke) message 124 to a visiting location register (VLR) 126 that last provided a registration notification for the called mobile station. The VLR 126 then sends a ROUTREQ (invoke) message at 128 to a destination MSC (V-MSC) 130. Both ROUTREQ messages 124 and 128 include BillingId.

Next, there are several ways the call can be delivered to the MS. First the V-MSC 130 sends out a page request in its area to see if the MS located in its area. If the MS is located in the V-MSC's 130 coverage area, the MS should respond to the page and the V-MSC sends out a ROUTREQ (response) message 132 to the VLR 126. This message returns the BillingId information.

At the same time the V-MSC 130 is sending out a page request to the MS, the V-MSC also sends ISPAGE (invoke) message 134 to several border MSC's 136. The ISPAGE message 134 will include BillingId information allowing the border MSC 136 to bill the call in the event the border MSC 136 delivers the call to the MS. The purpose of the ISPAGE message is to locate the MS in the event the MS is not located in its last registered V-MSC. In the event the MS is located in one of the border MSC's 136 and the MS sends a page response back to the border MSC 136, an ISPAGE (response) message 138 is sent back to the V-MSC 130. Message 138 contains the BillingId information. The V-MSC 130 then sends out the ROUTREQ (response) message 132 to the VLR 126 advising that the border MSC is prepared to set up the call.

Still yet another scenario to set up the call to the MS occurs when the MS in response to a page from the V-MSC sends a page response message to another border MSC 140 which did not receive the ISPAGE (invoke) message 134. This scenario can happen because upon receipt of a page, the MS goes through a rescan process looking for the strongest signal channel to lock onto. If that channel is associated with the coverage provided by border MSC 140, then the MS sends its page response back to the border MSC 140. At this time, the border MSC 140 sends an Unsolicited Response (UNSOLRES) (invoke) message 142 to the V-MSC 130 with BillingId information. The V-MSC 130 returns an UNSOLRES (response) message 144 to the border MSC 140. This return message includes BillingId information allowing the border MSC 140 to tag for the call. The V-MSC 130 then sends out the ROUTREQ (response) message 132 to the VLR 126 advising that the border MSC is prepared to set up the call.

After the ROUTREQ (response) message 132 is sent to the VLR 126, the VLR 126 in turn sends a ROUTREQ (response) message 146 back to HLR 122. HLR 122 then returns a return result (RETURNRESULT) message to the G-MSC. Messages 132, 146, and 148 all contain the BillingId generated by the V-MSC. As has been discussed heretofore in the Background of the Invention, the BillingId returned in messages 132, 146 and 148 may not be reliable when the Leg No. is a value other than 0.

Upon receipt of the RETURNRESULT (response) message 148 the call is delivered to the MS. Depending on which MSC (130, 136 or 140) has received the page response from the MS, one of the call deliveries (invoke) 150 or 160 will be set up.

In accordance with the present invention, once the call delivery (invoke) message 150 or 160 is set up, a return information back after call delivery (INFOBACKCDR) (response) message 152 or 162, respectively will be sent back from the MSC 130 or MSC 136 or 140. For all intents and purposes, the MSC to which the call is delivered may now be referred to as the V-MSC. This G-MSC 118 then sends a INFOBACKCDR (response) message 154 or 164 back to the V-MSC to complete the communications.

The INFOBACKCD message comprises the BillingId information originally forwarded by the G-MSC and also contains a new piece of information. This new information comprises the Related BillingId information which is generated by the V-MSC. The Related BillingId in this embodiment is used to correct the BillingId information returned by messages 132, 146, and 148. All of these messages can then be used to tag call transactions to the MS.

It is thus believed that the operation and construction of the present invention will be apparent from the foregoing description. While the method and system shown and described has been characterized as preferred, it will be readily apparent that various changes and modifications could be made therein without departing from the spirit and scope of the invention as defined in the following claims.

What is claimed is:

1. A data message handler (DMH) communication protocol system for use in a cellular telecommunications network for communicating accounting and billing information associated with a call to a mobile station within the network, said system comprising:

a visiting mobile switching center (V-MSC) where said mobile station to which the call is being directed is located;

a gateway mobile switching center (G-MSC) which upon delivery of said call to the G-MSC, generates first billing identification data and transmits the first billing identification data as part of a call invoke message to said V-MSC;

means within said V-MSC for allocating second billing identification data corresponding to a call transaction that has occurred in the V-MSC in response to said call invoke message; and means within said V-MSC for returning said second billing identification data to the G-MSC as related billing identification data after an outcome for the call has been determined.

2. The system of claim 1 wherein the outcome for the call is determined by the V-MSC upon receipt of a page response from the mobile station or after a call has been delivered from the G-MSC to the V-MSC.

3. The system of claim 1 wherein the V-MSC returns an information back for call delivery message that includes the related billing identification data and the first billing identification data forwarded from the G-MSC to the V-MSC, the information back for call delivery message being returned after the outcome of the call is determined in the V-MSC.

4. The system of claim 1 wherein the related billing identification data is formulated in the V-MSC by the V-MSC allocating an incremented leg number to the leg number of a previously generated related billing identification data when the delivered call is an extension of the original call to the mobile station and by the V-MSC allocating a new billing identification data when the delivered call is a new call or not an extension of an existing call.

5. The system of claim 1 wherein the V-MSC is selected from the group consisting of a mobile switching center (MSC) where the mobile station was last paged, a bordering MSC to the MSC where the mobile station was last registered and from which a page response message from the bordering MSC has been received, and a bordering MSC that receives an "unknown" page response from a mobile station that was paged by another MSC.

6. The system of claim 1 wherein the call invoke message generated by the G-MSC is selected for the group consisting of a feature request message, an origination request message, a location request message and a transfer number request message.

7. The system of claim 1 wherein the first billing identification data and the related billing identification data each include a switch identity number, a call identification, and a segment number identifying a call leg.

8. The system of claim 1 wherein the invoke message is sent to a home locating register (HLR) associated with the G-MSC, the HLR in turn sending a route request message to a visiting location register (VLR) associated with the V-MSC where the mobile station was last registered and said VLR in turn sending a route request message to said associated V-MSC.

9. A method of communicating accounting and billing operations information between a serving mobile switching center (serving MSC) and a destination mobile switching center (destination MSC) to which a call is being directed to a mobile station within a cellular telecommunications network. the method comprising the steps of:

generating in the serving MSC first billing identification data for the call;

transmitting the first billing identification data to the destination MSC;

generating second billing identification data in the destination MSC corresponding to a call transaction that has occurred in the destination MSC; and returning the second billing identification data as related billing identification data to the serving MSC after an outcome for the call has been determined in the destination MSC.

10. The method of claim 9 wherein the outcome of the call is determined in the destination MSC by the destination MSC first checking if there is a receipt of a page response from the mobile station and, if not, determining that a call has been delivered from the serving MSC to the destination MSC.

11. The method of claim 9 wherein the step of returning a related billing identification data to the serving MSC includes returning an information back for call delivery message that includes the related billing identification data and the first billing identification data transmitted from the serving MSC to the destination MSC.

12. The method of claim 9 wherein the step of generating second related billing identification data in the destination MSC includes:

allocating an incremented leg number to the leg number of a previously generated related billing identification data when the delivered call is an extension of an original call to the mobile station, and allocating a new billing identification data when the delivered call is a new call or not an extension of an existing call.

13. The method of claim 9 wherein the step of generating a first billing identification data for the call includes generating a call invoke message for one of the group consisting of a feature request message, an origination request message, a location request message, and a transfer number request message.

14. The method of claim 9 wherein the first billing identification data and the related billing identification data each include a switch identity number, a call identification number, and a segment number identifying a call leg.

15. The method of claim 9 wherein the invoke message is sent to a home location register (HLR) associated with the serving MSC, the HLR in turn sending a route request message to a visiting location register (VLR) associated with the destination MSC where the mobile station was last registered and said VLR in turn sending a route request message to said associated destination MSC.

16. A data message handler (DMH) communication protocol system for use in a cellular telecommunications network for communicating accounting and billing information associated with a call to a mobile station within the network. said system comprising:

a visiting mobile switching center (V-MSC) where said mobile station to which the call is being directed is located;

a gateway mobile switching center (G-MSC) which upon delivery of said call to the G-MSC, generates first billing identification data and transmits the first billing identification data as part of a call invoke message to said V-MSC;

means within said V-MSC for allocating second billing identification data corresponding to a call transaction that has occurred in the V-MSC in response to said call invoke message; and means within said V-MSC for returning said second billing identification data to the G-MSC as related billing identification data after the call has been delivered from the G-MSC to the V-MSC.

17. The system of claim 16 wherein the V-MSC returns an information back for call delivery message that includes the related billing identification data and the first billing identification data forwarded from the G-MSC to the V-MSC, the information back for call delivery message being returned after the outcome of the call is determined in the V-MSC.

18. The system of claim 16 wherein the related billing identification data is formulated in the V-MSC by the V-MSC allocating an incremented leg number to the leg number of a previously generated related billing identification data when the delivered call is an extension of the original call to the mobile station and by the V-MSC allocating a new billing identification data when the delivered call is a new call or not an extension of an existing call.

19. The system of claim 16 wherein the V-MSC is selected from the group consisting of a mobile switching center (MSC) where the mobile station was last paged, a bordering MSC to the MSC where the mobile station was last registered and from which a page response message from the bordering MSC has been received, and a bordering MSC that receives an "unknown" page response from a mobile station that was paged by another MSC.

20. The system of claim 16 wherein the call invoke message generated by the G-MSC is one of group consisting of a feature request message, an origination request message, a location request message and a transfer number request message.

21. The system of claim 16 wherein the first billing identification data and the related billing identification data each include a switch identity number, a call identification, and a segment number identifying a call leg.

22. The system of claim 16 wherein the invoke message is sent to a home locating register (HLR) associated with the G-MSC, the HLR in turn sending a route request message to a visiting location register (VLR) associated with the V-MSC where the mobile station was last registered and said VLR in turn sending a route request message to said associated V-MSC.

23. A method of communicating accounting and billing operations information between a serving mobile switching center (MSC) and a destination MSC to which a call is being directed to a mobile station within a cellular telecommunications network. the method comprising the steps of:

generating in the serving MSC first billing identification data for the call;

transmitting the first billing identification data to the destination MSC;

generating second billing identification data in the destination MSC corresponding to a call transaction that has occurred in the destination MSC; and, returning the second billing identification data as related billing identification data to the serving MSC after the call has been delivered from the serving MSC to the destination MSC.

24. The method of claim 23 wherein the step of returning related billing identification data to the serving MSC includes returning an information back for call delivery message that includes the related billing identification data and the first billing identification data transmitted from the serving MSC to the destination MSC.

25. The method of claim 24 wherein the step of generating second billing identification data in the destination MSC includes:

allocating an incremented leg number to the leg number of a previously generated related billing identification data when the delivered call is an extension of an original call to the mobile station, and allocating a new billing identification data when the delivered call is a new call or not an extension of an existing call.

26. The method of claim 24 wherein the step of generating a first billing identification data for the call includes generating a call invoke message for one of the group consisting of a feature request message, an origination request message, a location request message and a transfer number request message.

27. The method of claim 24 wherein the first billing identification data and the related billing identification data each include a switch identity number, a call identification number, and a segment number identifying a call leg.

28. The method of claim 24 wherein the invoke message is sent to a home locating register (HLR) associated with the serving MSC, the HLR in turn sending a route request message to a visiting location register (VLR) associated with the MSC where the mobile station was last registered, and said VLR in turn sending a route request message to its associated MSC.

* * * * *